(12) United States Patent
Mao

(10) Patent No.: US 8,920,680 B2
(45) Date of Patent: Dec. 30, 2014

(54) METHODS OF PREPARING CARBONACEOUS MATERIAL

(75) Inventor: Zhenhua Mao, Ponca City, OK (US)

(73) Assignee: Pyrotek, Inc., Spokane, WA (US)

( * ) Notice: Subject to any disclaimer, the term of this patent is extended or adjusted under 35 U.S.C. 154(b) by 806 days.

(21) Appl. No.: 13/083,094

(22) Filed: Apr. 8, 2011

(65) Prior Publication Data

US 2011/0248212 A1 Oct. 13, 2011

Related U.S. Application Data

(60) Provisional application No. 61/322,052, filed on Apr. 8, 2010.

(51) Int. Cl.
*H01B 1/04* (2006.01)
*H01M 4/587* (2010.01)
*C01B 31/02* (2006.01)
*H01M 10/0525* (2010.01)

(52) U.S. Cl.
CPC .............. *H01M 4/587* (2013.01); *C01B 31/02* (2013.01); *H01M 10/0525* (2013.01)
USPC ......... 252/502; 429/231.8; 427/212; 427/220

(58) Field of Classification Search
CPC ............ B05D 5/00; B05D 5/12; C01B 31/00; C01B 31/02; H01B 1/04
USPC ................ 427/212, 220; 423/364; 429/231.8; 252/502
See application file for complete search history.

(56) References Cited

U.S. PATENT DOCUMENTS

| | | | |
|---|---|---|---|
| 4,888,215 A | 12/1989 | Nakada et al. |
| 7,323,120 B2 | 1/2008 | Mao et al. |
| 7,618,678 B2 | 11/2009 | Mao et al. |
| 2003/0160215 A1 | 8/2003 | Mao et al. |
| 2005/0136330 A1 | 6/2005 | Mao et al. |
| 2007/0160752 A1 | 7/2007 | Mao |
| 2008/0090148 A1 | 4/2008 | Mao et al. |
| 2009/0025864 A1 | 1/2009 | Fox |
| 2009/0242830 A1 | 10/2009 | Mao et al. |
| 2010/0301267 A1 | 12/2010 | Mao et al. |
| 2011/0070498 A1 | 3/2011 | Mao et al. |

OTHER PUBLICATIONS

PCT Notification of Transmittal of the International Search Report and the Written Opinion of the International Searching Authority, or the Declaration, International Application No. PCT/US2011/031766, International Filing Date: Aug. 4, 2011, 10 pages.

*Primary Examiner* — Mark Kopec
*Assistant Examiner* — Haidung Nguyen
(74) *Attorney, Agent, or Firm* — Wells St. John PS

(57) ABSTRACT

Methods and apparatus relate to methods of making carbonaceous material or coating from a precursor. Oxidation of hydrocarbons forming the precursor occurs upon adding an oxidation agent to a mixture of the precursor and a solvent for the precursor. The oxidation of the hydrocarbons yields constituents that are insoluble in the solvent and may not melt. The constituents that are insoluble in the solvent may further coat solid particles, if the solid particles are provided in the mixture. Carbonization of solids recovered by separation from liquids in the mixture increases carbon weight percent of the constituents that are insoluble in the solvent. The methods result in products that provide the carbonaceous material or coating and are suitable for use in electrodes.

26 Claims, 2 Drawing Sheets

METHODS OF PREPARING CARBONACEOUS MATERIAL

CROSS-REFERENCE TO RELATED APPLICATIONS

This application is a non-provisional application which claims benefit under 35 USC §119(e) to U.S. Provisional Application Ser. No. 61/322,052 filed Apr. 8, 2010 entitled "METHODS OF PREPARING CARBONACEOUS MATERIAL," which is incorporated herein in its entirety.

STATEMENT REGARDING FEDERALLY SPONSORED RESEARCH OR DEVELOPMENT

None

FIELD OF THE INVENTION

Embodiments of the invention relate to making carbonaceous products such as powders utilized in electrodes of electrochemical storage devices.

BACKGROUND OF THE INVENTION

Various prior processes enable production of petroleum and coal tar pitches for numerous applications. The processes include fractionation, thermal cracking, and heat-soaking. Complexity of the processes and time required to produce the pitches with the prior processes contributes to cost of the pitches that are in limited supply.

The pitches form precursor materials for applications including use as coatings and binder. For example, pitch coating procedures that are distinct from the processes used to make the pitches provide one known option for making battery electrode material with desirable electrical properties. Price of obtaining the pitches used for the coating procedures thus passes through to expense in producing the electrode material.

Post coating treatments or stabilizations prior to carbonization of such pitch coatings further increase the expense in producing the electrode material when using the pitches generated with prior techniques. The battery electrode material may include the pitch coatings on milled particles of carbonaceous material such as coke. In addition to cost factors, this milling may influence criteria for production of the electrode material by preventing or limiting ability to achieve desirable particle size and morphology of the milled particles for some applications.

Therefore, a need exists for improved methods and systems for making carbonaceous products including particles suitable for use in electrodes of electrochemical storage devices.

SUMMARY OF THE INVENTION

In one embodiment, a method of preparing carbonaceous material includes preparing a mixture containing hydrocarbons and a solvent for the hydrocarbons that have a higher boiling point than the solvent and reacting the hydrocarbons with an oxidizer to increase concentration of constituents that are insoluble in the solvent. The method further includes separating the mixture into liquids and solids including the constituents that are insoluble in the solvent. Carbonizing the constituents that are insoluble in the solvent provides the carbonaceous material.

According to one embodiment, a method of preparing carbonaceous material includes preparing a mixture containing hydrocarbons, a solvent for the hydrocarbons that have a higher boiling point than the solvent and solid particles suspended in the mixture. Upon adding an oxidizer to the mixture, the oxidizer reacts with the hydrocarbons to cause a coating to deposit on the solid particles. The method also includes separating from liquids in the mixture the particles with the coating and carbonizing the coating into the carbonaceous material on the solid particles.

For one embodiment, a method of preparing carbonaceous material includes preparing a mixture containing solvent, solid particles and hydrocarbons with a higher boiling point than the solvent and without content insoluble in the solvent. An oxidizer added to the mixture reacts with the hydrocarbons to form products that are insoluble in the solvent and provide a coating of the carbonaceous material on the solid particles. In addition, the method includes incorporating the solid particles with the coating into an electrode of an electrochemical energy cell.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to methods of making carbonaceous material or coating from a precursor. Oxidation of hydrocarbons forming the precursor occurs upon adding an oxidation agent to a mixture of the precursor and a solvent for the precursor. The oxidation of the hydrocarbons yields constituents that are insoluble in the solvent and may not melt. The constituents that are insoluble in the solvent may further coat solid particles, if the solid particles are provided in the mixture. Carbonization of solids recovered by separation from liquids in the mixture increases carbon weight percent of the constituents that are insoluble in the solvent. The methods result in products that provide the carbonaceous material or coating and are suitable for use in electrodes.

Figure 1:
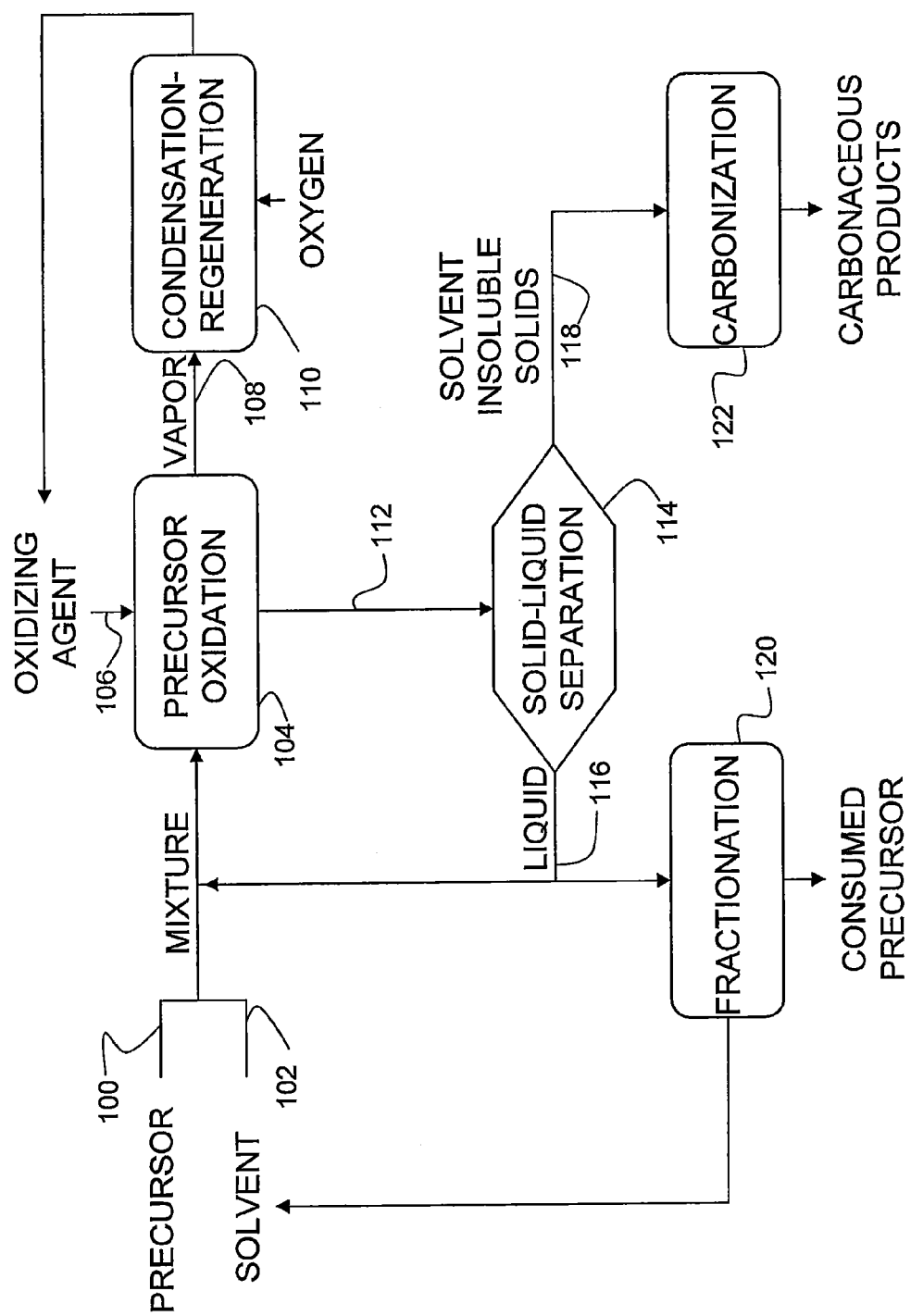
FIG. 1 is a flow diagram for making carbonaceous products, according to one embodiment of the invention.

FIG. 1 shows an exemplary flow diagram of one embodiment for making carbonaceous products. Combining a precursor 100 with a solvent 102 forms a mixture within a reactor 104. As described further herein, the precursor 100 includes compounds that upon oxidation form products that are insoluble in the solvent 102. The oxidation occurs upon addition of an oxidizing agent 106 to the mixture in the reactor 104.

The precursor 100 utilized in some embodiments include heavy aromatic hydrocarbon residues from petroleum refinery and/or chemical process residuals. As used herein, hydrocarbons referred to as the heavy aromatic hydrocarbon residues may include one or more properties defined by a boiling point above 300° C., above 450° C., above 500° C. or at least greater than the solvent 102, an average molecular weight above 300, average carbon atoms per molecule greater than 50, a greater aromatic content than paraffin content, and a higher viscosity than the solvent 102. For some embodiments, the solvent 102 dissolves the precursor 100 prior to the oxidation such that the precursor 100 lacks any content insoluble in the solvent 102. Examples of the precursor 100 include at least one of decant oils (e.g., with boiling points above about 454° C. or above about 510° C.), petroleum refinery vacuum residual, heavy portion of thermal cracked oils, pyrolysis tars from polymer synthesis and coal tars.

The solvent 102 functions to decrease viscosity of the precursor 100 and is utilized in a concentration selected to control reaction rate between the oxidizer 106 and the precursor 100. This control of the reaction rate by dilution of the precursor 100 limits gas bubble rate to avoid creating uncontainable foam and limits temperature rising beyond control since the oxidation is exothermic. Suitable examples of the solvent 102 for dissolving the precursor 100 include at least one of toluene, xylene, quinoline, tetrahydrofuran, tetrahydronapthalene and naphthalene. A ratio of the solvent 102 to the precursor 100 in some embodiments ranges between about 0.2 and about 10.0, between about 0.2 and about 5.0, or between about 0.5 and about 3.

The precursor 100 may be dissolved in the solvent 102 at a temperature, such as at ambient temperature (e.g., about 23° C.) or up to about 60° C., that is below the boiling point of the solvent 102. Length of mixing time (e.g., 5 minutes) depends on dissolution rate of the precursor 100 in the solvent 102 and may enable total dissolving of the precursor and homogeneity of the mixture. Adding the oxidizing agent 106 to the mixture in the reactor 104 occurs once the precursor 100 and the solvent 102 are mixed.

Gaseous, solid and/or liquid oxidizers may provide the oxidizing agent 106. Suitable examples of the oxidizing agent 106 include ozone, oxygen gas, thionyl fluoride, sulfur trioxide, nitrogen dioxide, nitric acid ($HNO_3$), thionyl chloride, metal nitrates, inorganic and organic peroxides such as hydrogen peroxide and benzoyl peroxide, ammonium peroxydisulfate, and perchloric acid. Initial introduction of the oxidizing agent 106 into the mixture occurs with the mixture at a temperature below about 120° C., below about 100° C. or below about 65° C. When nitric acid is used as the oxidizer, the mixture temperature may rise from exothermic reaction heat by about 4° C. to about 8° C. if this starting temperature is below 55° C. and may rise from the exothermic reaction heat by about 15° C. to about 20° C. if this starting temperature is above 65° C. Without being limited to any particular theory, the precursor 100 and the oxidizing agent 106 react together and are believed to do so via distinct first and second reactions occurring at respectively any temperature and at temperatures above about 70° C. Controlling the reaction temperature below the boiling point of the solvent 102 while reaching at some point during the reaction at least 70° C. thus facilitates completing the oxidation. For example, the mixture may remain below 120° C. during the reacting of the precursor 100 with the oxidizing agent 106 under continuous agitation of the mixture. A ratio of the precursor 100 to the oxidizing agent 106 in some embodiments ranges between about 15.0 and about 1.0 or between about 7.0 and about 2.

Gasses produced in the reactor 104 include resulting gaseous byproducts, such as nitrogen dioxide and nitrogen monoxide when nitric acid is used as the oxidizing agent 106. After the oxidation, heating the mixture to between a boiling point of the oxidizing agent 106 and a boiling point of the solvent 102, such as about 135° C.-140° C. corresponding to the boiling point of xylene if used as the solvent 102, also vaporizes water and the oxidizing agent that is either consumed or un-reacted. In some embodiments, the oxidation takes less than 10 minutes to complete. Monitoring temperature of the mixture throughout the oxidation may identify completing of the reactions between the precursor 100 and the oxidizing agent 106.

A vapor stream 108 removed from the reactor 104 feeds into a regenerator 110. Some embodiments may omit the regenerator 110 since disposing of recovered oxidizer may be more economical than recycling for reuse. The regenerator 110 condenses and/or absorbs the gases in the vapor stream 108. In some embodiments, additional nitric acid absorbs the gaseous byproducts prior to conversion into nitric acid by reacting with oxygen gas. Excess water may be distilled out of the nitric acid produced in the regenerator 110 to enable reuse as the oxidizing agent 106.

The oxidation cross-links compounds in the precursor 100 producing heavier hydrocarbons than present in the precursor 100 prior to the oxidation and that are not soluble in the solvent 102. To recover these particulate products, a slurry 112 removed from the reactor 104 passes through a separator 114 to remove solvent insoluble solids 118 from liquids 116 in the slurry 112. Cooling the slurry to below 30° C. or to about 23° C. before such separation facilitates recovery also of solids with temperature dependent solubility in the solvent 102. In some embodiments, the separator 114 employs filtration, evaporation/fractionation, decantation or centrifugation to achieve the separation. After initial filtration, a fresh quantity of the solvent 102 may wash or rinse the solids 118.

The solids 118 in some embodiments possess a melting point above 300° C. or do not melt at any temperature under nitrogen atmosphere. Heating the solids 118 in a furnace 122 in inert gas such as nitrogen gas achieves carbonization. When the solids 118 do not melt or soften upon heating, the solids 118 can undergo the carbonization without risk of agglomeration or sintering of particles and hence without need for stabilization treatments preceding the carbonization. The carbonization refers to a thermal treatment that functions primarily to increase a carbon/hydrogen ratio of the solids 118. In some embodiments, the carbonization of the solids 118 is carried out in an inert atmosphere at a temperature of from about 600° C. to about 1400° C., from about 700° C. to about 1300° C., or from about 750° C. to about 1200° C. for from about 0.1 hours to about 2 hours. Examples of gases making up the inert atmosphere include nitrogen, argon, helium, carbon dioxide, carbon monoxide, hydrogen or combinations thereof. The solids 118 thermally reacted in the inert atmosphere to at least 850° C. form the carbonaceous products and are at least 10%, at least 40%, at least 60%, or at least 85% by weight carbon, based on mass following the carbonization compared to original mass of the solids 118.

Depending on application, the solids 118 may not require any milling or processing other than the carbonization since the solids 118 as produced have an average particle size of less than about 50 µm, or from about 1 µm to about 30 µm. Some embodiments utilize the solids 118 as electrode or anode materials in electrochemical energy cells, such as batteries, capacitors and fuel cells. Further, the solids 118 may provide a substrate or support for applying thereon one or more coating layers, such as described herein.

In some embodiments, at least part of the liquids 116 from which the solids 118 are removed by the separator 114 recycle back to supply some of the precursor 100 and/or the solvent 102. For example, about three quarters of the liquids 116 may input back into the mixture feeding into the reactor 104 without any additional treatment. Use of recycled liquids 116 provide equivalent yields of the solids 118 as if using fresh supplies of the precursor 200 indicating ability to reuse the precursor 200 at least twice. A remainder of the liquids 116 may pass through a distillation column 120 to recover the solvent 102 and dispose of reacted precursor. The solvent collected from the washing of the initial filtrate may also pass through the distillation column 120 to recover the solvent 102.

Figure 2:
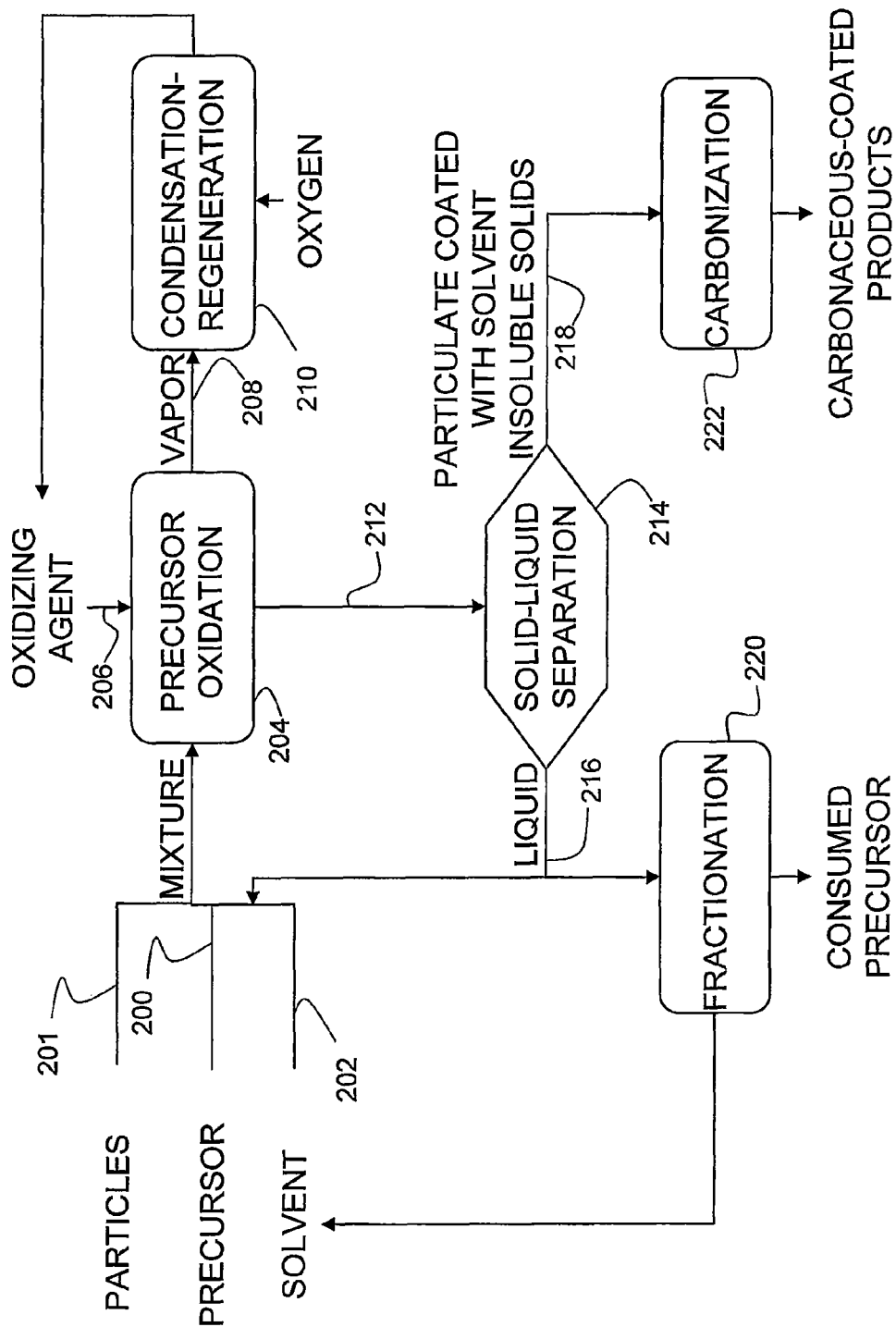
FIG. 2 is a flow diagram for depositing a coating of solvent insoluble solids on particulate to make carbonaceous products, according to one embodiment of the invention.

FIG. 2 illustrates a flow diagram for depositing a coating of solvent insoluble solids on particulate to make carbonaceous products. Particles 201 provide substrate material onto which the solvent insoluble solids are deposited upon oxidation of a precursor 200 mixed with a solvent 202 along with the particles 201 suspended therein. Although applicable to varying sizes and particle size distributions, the particles 201 may have an average particle size of less than about 50 µm, or from about 1 µm to about 30 µm.

In some embodiments, carbonaceous particulate forms the particles 201, which may thus be obtained from a variety of sources including petroleum pitches, coal tar pitches, calcined petroleum cokes, uncalcined petroleum cokes, highly crystalline cokes (e.g., calcined or uncalcined, highly crystalline "needle" cokes), flake coke, coal tar cokes, synthetic graphites, natural graphites, soft carbons derived from organic polymers and soft carbons derived from natural polymer. Thus, the particles 201 in some embodiments are either graphitic materials or materials which form graphite on heating to graphitization temperatures of 2200° C. or higher. The particles 201 can be provided by methods such as milling, crushing or grinding to have dimensions suitable for use in formation of electrodes.

For some embodiments, other (e.g., ceramic, metallic and combinations thereof) compositions that are not carbonaceous may make up the particles 201 onto which it is desirable to have a carbonaceous coating. Such applications include cathode materials where the particles 201 may include compositions of lithium iron phosphate or lithium vanadium phosphate, for example. Silicon or metal and metal alloys such as tin and tin alloys particulate may form the particles 201 in applications for preparing other anode materials.

The coating forms by adding an oxidizing agent 206 to a mixture of the precursor 200, the solvent 202, and the particles 201 in a reactor 204 using reaction conditions, the solvent 202 and the precursor 200 that are the same as those described with respect to FIG. 1, which is analogous to FIG. 2 other than inclusion of the particles 201 in the mixture. A vapor stream 208 from the reactor 204 may supply a regenerator 210 for recycling of the oxidizing agent 206. Further, a separator 214 divides a slurry 212 from the reactor 204 into liquids 216 and solids 218 formed of the particles 201 coated with solvent insoluble products from reaction of the precursor 200 with the oxidizing agent 206. Any portion of the liquids 216 may recycle back to the reactor 204 and/or be treated in a distillation column 220 to recover the solvent 202.

Amount of the coating on the particles 201 may range from about 1 weight percent to about 20 weight percent of the solids 218. For example, supplying one weight unit of the particles 201 for between 4 and 5 weight units of the solvent 202, between 0.8 and 1.0 weight units of the precursor 200 and between 0.15 and 0.2 weight units of the oxidizing agent 206 achieves such coating levels. Subsequent batches may operate with fresh quantities between 0.8 and 1.2 weight units of the solvent 202, between 0.25 and 0.3 weight units of the precursor 200 and between 0.1 and 0.12 weight units of the oxidizing agent 206 when between 3.8 and 5.0 weight units of the solvent and the precursor is recycled for adding to the fresh quantities. The coating of the solids 218 in some embodiments also does not melt and is at least 10%, at least 40%, at least 60%, or at least 85% by weight carbon, based on mass following the carbonization compared to original mass of the solids 218. For some embodiments, electrochemical energy cells, such as batteries, capacitors and fuel cells, incorporate the solids 218 that have the coating and may be heat treated in a furnace 222 to carbonize at least the coating of the solids 218, thereby producing the carbonaceous products

EXAMPLES

Example 1

A mixture was prepared with 19.6 grams of 510° C. boiling point fraction from a decant oil (ConocoPhillips refinery) and 7.3 grams of xylene and heated to about 100° C. While the mixture was continuously agitated, 4.0 grams of 69% nitric acid was added into the mixture at a rate to maintain the temperature at about 100° C. Next, the mixture was agitated and heated to about 138° C. with additional boiling xylene added making ratio of xylene to decant oil 5 to 1 prior to being cooled to about 23° C.

Xylene insoluble solid particles were then separated out of the mixture by filtration, washed twice with 200 milliliters of xylene and dried at 100° C. under vacuum for 15 hours. A resulting powder weighed 2.4 grams, or 12% of initial amount of the decant oil that did not contain any xylene insoluble content. The resulting powder did not melt under nitrogen atmosphere at any temperature.

A stabilization was conducted under reduced air pressure (−20 inch Hg) with the following heating sequence: 5° C./minute to 180° C., held at 180° C. for 1 hour, 1° C./minute to 200° C. and held at 200° C. for 1 hours, 1° C./minute to 250° C., and held at 250° C. for 3 hours, and 1° C./minute to 300° C., and held at 300° C. for 10 hours. Carbonization was conducted under the same condition in the same furnace under nitrogen gas atmosphere with a temperature profile as follows: 5° C./minute to 350° C., held at 350° C. for one hour, 5° C./minute to 450° C., held at 450° C. for two hours, and 5° C./minute to 850° C., held at 850° C. for two hours, and cooled down at 5° C./minute to ambient temperature. After the carbonization, carbon content that remained was 69% of initial solid content.

Example 2

A mixture was prepared with 29.0 grams of 510° C. boiling point fraction from a decant oil (ConocoPhillips refinery), 22.7 grams of green coke particles with an average particle size of 8 µm and 138.0 grams of xylene and heated to about 65° C. While the mixture was continuously agitated, 6.93 grams of 69% nitric acid was added into the mixture at a rate to maintain the temperature below 80° C. Next, the mixture was agitated and heated to about 138° C. prior to being cooled to about 23° C.

Particulate coated with xylene insoluble solid products were then separated out of the mixture by filtration, washed twice with 200 milliliters of xylene and dried at 100° C. under vacuum for 15 hours. The resulting powder was examined under scanning electron microscope and found that each of the coke particles was coated with deposits from oxidation of the decant oil. Based on weight of a resulting powder, the powder had a coating level of the deposits on the coke particles of 18.2% to provide a yield of 17% from initial amount of the decant oil that did not contain any xylene insoluble content. While no stabilization was conducted, a carbonization was conducted as set forth in Example 1. After the carbonization, carbon content of both the green coke and the coating that remained was 83.8% of initial weight.

Example 3

A mixture was prepared with 19.7 grams of 510° C. boiling point fraction from a decant oil (ConocoPhillips refinery), 19.7 grams of calcined coke particles with an average particle size of 8 μm and 55.0 grams of xylene and heated to about 102° C. While the mixture was continuously agitated, 4.0 grams of 69% nitric acid was added into the mixture at a rate to maintain the temperature below 105° C. Next, the mixture was agitated and heated to about 138° C. with additional boiling xylene added making ratio of xylene to decant oil 5 to 1 prior to being cooled to about 23° C.

Particulate coated with xylene insoluble solid products were then separated out of the mixture by filtration, washed twice with 200 milliliters of xylene and dried at 100° C. under vacuum for 15 hours. The resulting powder was examined under scanning electron microscope and found that each of the coke particles was coated with deposits from oxidation of the decant oil. Based on weight of a resulting powder, the powder had a coating level of the deposits on the coke particles of 9.7% to provide a yield of 11.3% from initial amount of the decant oil that did not contain any xylene insoluble content. Both stabilization and carbonization were conducted as set forth in Example 1. After the stabilization and the carbonization, carbon content of the coating that remained was 69.5% of initial coating.

Example 4

A mixture was prepared with 20.0 grams of 510° C. boiling point fraction from a decant oil (ConocoPhillips refinery), 20.0 grams of calcined coke particles with an average particle size of 8 μm and 120.0 grams of xylene and heated to about 66° C. While the mixture was continuously agitated, 4.0 grams of 69% nitric acid was added into the mixture at a rate to maintain the temperature below 71° C. Next, the mixture was agitated and heated to about 138° C. prior to being cooled to about 23° C.

Particulate coated with xylene insoluble solid products were then separated out of the mixture by filtration, washed twice with 200 milliliters of xylene and dried at 100° C. under vacuum for 15 hours. The resulting powder was examined under scanning electron microscope and found that each of the coke particles was coated with deposits from oxidation of the decant oil. Based on weight of a resulting powder, the powder had a coating level of the deposits on the coke particles of 7.2% to provide a yield of 7.7% from initial amount of the decant oil that did not contain any xylene insoluble content. While no stabilization was conducted, a carbonization was conducted as set forth in Example 1. After the carbonization, carbon content of the coating that remained was 74.7% of initial coating.

Example 5

A mixture was prepared with 48.8 grams of 510° C. boiling point fraction from a thermal tar (ConocoPhillips refinery), 50.5 grams of calcined coke particles with an average particle size of 8 μm and 278.0 grams of xylene and heated to about 62° C. While the mixture was continuously agitated, 12.1 grams of 69% nitric acid was added into the mixture at a rate to maintain the temperature below 68° C. Next, the mixture was agitated and heated to about 138° C. prior to being cooled to about 23° C.

Particulate coated with xylene insoluble solid products were then separated out of the mixture by filtration, washed twice with 200 milliliters of xylene and dried at 100° C. under vacuum for 15 hours. The resulting powder was examined under scanning electron microscope and found that each of the coke particles was coated with deposits from oxidation of the decant oil. Based on weight of a resulting powder, the powder had a coating level of the deposits on the coke particles of 10.5% to provide a yield of 12.1% from initial amount of the decant oil that did not contain any xylene insoluble content. While no stabilization was conducted, a carbonization was conducted as set forth in Example 1. After the carbonization, carbon content of the coating that remained was 74.6% of initial coating.

Electrochemical properties including specific capacity and coulombic efficiency for lithium ion intercalation/de-intercalation were determined using coin cells charged and discharged between 0 and 2 volts and with anodes made from each of Examples 1-5 and lithium metal foil as counter electrodes. Results demonstrated the stabilization was not required and suitability of using methods herein that synthesize compounds from various precursor sources and as part of material preparations instead of other approaches that rely on separate processing of already formed compounds. Table 1 shows the results from these tests.

TABLE 1

| | Coke Powder Substrate | Stabilized Before Carbonization | $1^{st}$ Cycle Capacity (mAh/g) | $1^{st}$ Cycle Efficiency (%) | $5^{th}$ Cycle Capacity (mAh/g) | $5^{th}$ Cycle Efficiency (%) | Coating Level (%) |
|---|---|---|---|---|---|---|---|
| Ex. 1 | None | Yes | 180.9 | 70.7 | 178.8 | 98.9 | N/A |
| Ex. 2 | Green | No | 308.3 | 92.3 | 305.0 | 99.4 | 18.2 |
| Ex. 3 | Calcined | Yes | 328.3 | 96.7 | 325.3 | 100.0 | 9.7 |
| Ex. 4 | Calcined | No | 329.4 | 96.6 | 326.4 | 100.0 | 7.2 |
| Ex. 5 | Calcined | No | 323.9 | 96.5 | 319.3 | 100.0 | 10.5 |

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method, comprising:
   preparing a mixture containing hydrocarbons and a solvent for the hydrocarbons wherein the boiling point of the hydrocarbons is higher than that of the solvent;
   adding an oxidizer to the mixture and reacting the hydrocarbons with the oxidizer to increase concentration of constituents of the mixture that are insoluble in the solvent;
   separating the mixture into liquids and solids where the solids are including the constituents that are insoluble in the solvent and such that the solvent is generally separated with the liquid; and carbonizing the constituents that are insoluble in the solvent to provide carbonaceous material.

2. The method according to claim 1, wherein the oxidizer is liquid and is selected from nitric acid, thionyl chloride, peroxide, perchloric acid and benzoyl peroxide.

3. The method according to claim 1, wherein the oxidizer is gaseous and is selected from oxygen, ozone, nitrogen dioxide and sulfur trioxide.

4. The method according to claim 1, wherein the oxidizer includes ammonium persulfate.

5. The method according to claim 1, wherein the solvent is an organic compound or compound mixture and includes at least one of xylene and toluene.

6. The method according to claim 1, wherein the hydrocarbons are at least one of decant oil, petroleum refinery vacuum residual, thermal cracked oils, pyrolysis tars and coal tars.

7. The method according to claim 1, wherein the oxidizer includes nitric acid, the solvent includes xylene and the hydrocarbons include decant oil having a boiling point above 450° C.

8. The method according to claim 1, wherein the carbonizing includes heating the solids above 400° C. in an inert environment.

9. The method according to claim 1, wherein the hydrocarbons do not include any content that is insoluble in the solvent prior to the step of adding oxidizer and reacting of the hydrocarbons with the oxidizer.

10. The method according to claim 1, further comprising incorporating the carbonaceous material into an electrode of an electrochemical energy cell.

11. The method according to claim 1, wherein the mixture further includes carbonaceous suspended particles, which upon the step of adding oxidizer and reacting of the hydrocarbons with the oxidizer are coated by the constituents that are insoluble in the solvent.

12. The method according to claim 1, wherein the mixture further includes coke particles, which upon the step of adding oxidizer and reacting of the hydrocarbons with the oxidizer are coated by the constituents that are insoluble in the solvent.

13. The method according to claim 1, wherein the mixture remains below 120° C. during the reacting of the hydrocarbons with the oxidizer.

14. The method according to claim 1, wherein the mixture during the reacting of the hydrocarbons with the oxidizer is above 70° C. and remains below 120° C.

15. The method according to claim 1, wherein a mass ratio of the solvent to the hydrocarbons is between 0.2 and 10.0.

16. The method according to claim 1, wherein a mass ratio of the hydrocarbons to the oxidizer is between 15 and 1.

17. A method, comprising:
preparing a mixture containing hydrocarbons, a solvent for the hydrocarbons, wherein the boiling point of the hydrocarbons is higher than that of the solvent and solid particles suspended in the mixture;
adding an oxidizer to the mixture, wherein the oxidizer reacts with the hydrocarbons to cause a coating to deposit on the solid particles;
separating the coated solid particles from liquids in the mixture; and
carbonizing the coating into carbonaceous material disposed on the particles.

18. The method according to claim 17, wherein the solid particles in the mixture are carbonaceous.

19. The method according to claim 17, wherein the oxidizer is nitric acid, the solvent is xylene and the hydrocarbons are decant oil having a boiling point above 450° C.

20. The method according to claim 17, further comprising incorporating the solid particles with the coating that is carbonized into an electrode of an electrochemical energy cell.

21. A method, comprising:
preparing a mixture containing solvent, solid particles and hydrocarbons, wherein the boiling point of the hydrocarbons is higher than that of the solvent;
adding an oxidizer to the mixture, wherein the oxidizer reacts with the hydrocarbons to form products that are insoluble in the solvent and provide a coating of carbonaceous material on the solid particles;
separating the coated solid particles from liquids in the mixture; and
incorporating the solid particles with the coating into an electrochemical energy cell.

22. The method according to claim 21, further comprising carbonizing the coating on the solid particles.

23. The method of claim 1, wherein the reaction in the mixture between the oxidizer and the hydrocarbons causes compounds in the hydrocarbons to cross-link, thereby producing heavier hydrocarbons that are not soluble in the solvent.

24. The method of claim 17, wherein the reaction in the mixture between the oxidizer and the hydrocarbons causes compounds in the hydrocarbons to cross-link, thereby producing heavier hydrocarbons that are not soluble in the solvent.

25. The method of claim 21, wherein the reaction in the mixture between the oxidizer and the hydrocarbons causes compounds in the hydrocarbons to cross-link, thereby producing heavier hydrocarbons that are not soluble in the solvent.

26. The method of claim 21, wherein the mixture containing solvent, solid particles and hydrocarbons does not include other content which is insoluble in the solvent prior to adding the oxidizer.

* * * * *